United States Patent [19]
Hettiger

[11] 4,295,161
[45] Oct. 13, 1981

[54] KEYED NOISE FILTER IN A TELEVISION RECEIVER

[75] Inventor: James Hettiger, Indianapolis, Ind.

[73] Assignee: RCA Corporation, New York, N.Y.

[21] Appl. No.: 142,031

[22] Filed: Apr. 21, 1980

[51] Int. Cl.³ .............................................. H04N 9/12
[52] U.S. Cl. ..................................... 358/34; 358/172; 358/168
[58] Field of Search .................... 358/33, 34, 36, 172, 358/177, 178, 243, 168, 74

[56] References Cited

U.S. PATENT DOCUMENTS

| | | |
|---|---|---|
| 3,544,714 | 12/1970 | Stoll . |
| 3,927,255 | 12/1975 | Yorkanis . |
| 3,949,165 | 4/1976 | Lynch . |
| 3,976,836 | 8/1976 | Wheeler . |
| 4,044,375 | 8/1977 | Norman .......................... 358/168 X |
| 4,110,790 | 8/1978 | Wheeler . |
| 4,197,557 | 4/1980 | Tuma et al. ........................... 358/34 |

Primary Examiner—Robert L. Richardson
Attorney, Agent, or Firm—Eugene M. Whitacre; William H. Meagher; Ronald H. Kurdyla

[57] ABSTRACT

A video signal channel in a television receiver includes a keyed filter, followed by a keyed automatic brightness control circuit for establishing a desired black or blanking level for the video signal. The brightness control circuit operates during blanking intervals of the video signal to sense the blanking level of the video signal for deriving a control signal which is utilized to maintain a desired blanking level. The filter comprises a high-pass filter circuit which is decoupled for filtering purposes during image intervals, but is coupled to the video channel during the blanking intervals for suppressing high frequency signals including noise, when present, in the video channel during the blanking intervals. The sensed blanking level and the control voltage are therefore unaffected by noise components which would otherwise impair the control signal and thereby the operation of the brightness control circuit.

12 Claims, 3 Drawing Figures

KEYED NOISE FILTER IN A TELEVISION RECEIVER

This invention relates to a television receiver signal processing system including a clamping circuit operative during picture retrace blanking intervals to establish a desired blank or blanking level for the television signal. In particular, the invention concerns such a system arranged for noise immune clamping operation.

The luminance component of both monochrome and color television signals contains a blanking level which approximates the black level of a displayed picture and also serves as a picture brightness reference level. The brightness determining blanking level of a video output signal which is to be applied to an image reproducing kinescope preferably should exhibit a fixed relationship (i.e., track closely) with a locally developed reference voltage such as may be provided by a viewer adjustable brightness control potentiometer.

The video blanking level can vary undesirably for a variety of reasons. To compensate for such variations it is known to provide circuitry in a television receiver for automatically controlling the signal blanking level so that deviations from an expected level are minimized. One automatic brightness control circuit for achieving this result is described in U.S. Pat. No. 4,197,557 of A. V. Tuma, et al. entitled, "Brightness Control Circuit Employing A Closed Control Loop." In this arrangement, a sampling comparator circuit is keyed during periodic blanking intervals of the video signal to sample the magnitude of a locally developed reference voltage and the brightness representative blanking level of the video signal. An output control signal indicative of the voltage difference between the reference voltage and blanking level is stored on a capacitor, and utilized to control the video signal so that the blanking level is translated in a direction to minimize the voltage difference.

In order to develop an appropriate control signal in a system of this type, the storage capacitor is periodically charged and discharged in accordance with the magnitude and relative polarity of the voltage difference between the reference voltage and the blanking level. It is herein recognized that the desired control voltage can be impaired in the presence of a video signal containing a signficant amount of noise, particularly during signal blanking intervals when the comparator control circuit operates. This in turn can cause a displayed picture to exhibit momentary, disturbing changes in background level (brightness). Accordingly, there is herein described an arrangement for minimizing the likelihood that the operation of the keyed blanking level control circuit will be impaired due to noise.

Apparatus according to the present invention is included in a television receiver having a video signal channel for processing an image representative video signal with periodically recurring image intervals, and image blanking intervals disposed between adjacent image intervals and containing a blanking level determinative of image brightness. A clamping network is coupled to the video channel and to a reference signal representative of a desired image blanking level, for clamping the blanking level of the video signal to a level proportional to the reference signal during the blanking intervals. A filter is selectively coupled to the video channel prior to the clamping network during the blanking intervals to suppress high frequency signals including noise when present in the video channel. The filter is decoupled from the video channel during the image intervals.

Figure 1:
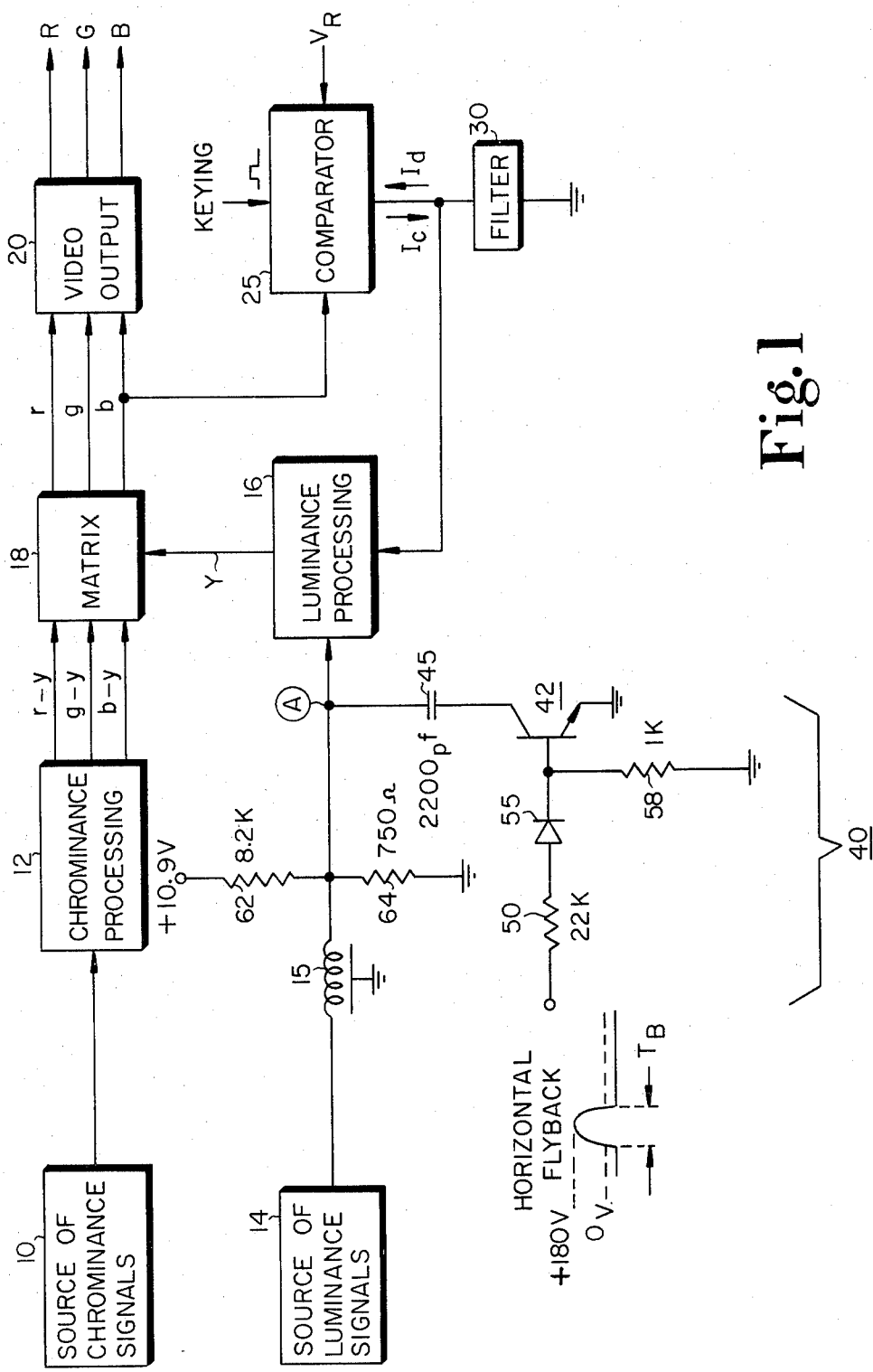
FIG. 1 shows, partly in block diagram form and partly in schematic circuit diagram form, a portion of a color television receiver including apparatus according to the present invention.

In FIG. 1, chrominance signals from a source 10 are processed by a unit 12 to develop r-y, g-y and b-y color difference signals. Luminance signals from a source 14 are coupled via a delay line 15 to a unit 16 (e.g., including signal amplifier stages) for processing the luminance signal to produce an amplified luminance signal Y at an output. Delay line 15 serves to equalize the signal processing transit time of the luminance channel (including source 14 and unit 16) relative to the chrominance channel (including source 10 and unit 12) so that processed luminance and chrominance signals arrive at a matrix 18 with proper timing synchronism.

Figure 2:
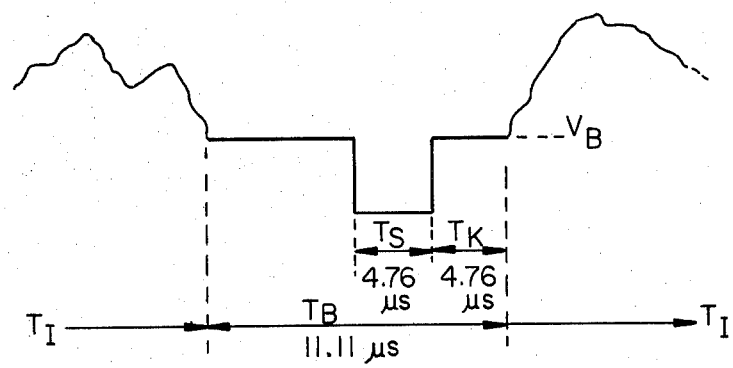
FIG. 2 illustrates a signal waveform useful in understanding the operation of the apparatus shown in FIG. 1.

The luminance signal is shown in pertinent part in FIG. 2. The luminance signal comprises a horizontal line blanking interval $T_B$ occurring periodically between adjacent horizontal image intervals $T_I$. The blanking interval includes a negative-going horizontal synchronizing pulse during an interval $T_S$, followed by a so-called "back porch" interval $T_K$ during which time an associated blanking level $V_B$ (approximating the black level of a displayed picture) is sensed as will be discussed.

The amplified luminance signal Y is combined with the color difference signals in matrix 18 for producing r, g, and b color image representative signals. These signals are amplified by a video output stage 20 for providing high level R, G and B color signals suitable for application to intensity control electrodes of a color kinescope (not shown).

The system also includes a closed loop automatic brightness control network comprising a keyed sampling comparator 25 and an associated output filter 30 (e.g., a charge storage capacitor). Comparator 25 and filter 30 are arranged as a keyed clamping network in a closed loop feedback configuration with luminance processor 16 and matrix 18, as described in detail in the aforementioned patent of A. V. Tuma, et al., U.S. Pat. No. 4,197,557.

Briefly, one signal input of comparator 25 senses the low level blue (b) signal output of matrix 18, and a second signal input of comparator 25 senses a brightness reference voltage $V_R$ (e.g., as developed by a viewer adjustable brightness control potentiometer). Comparator 25 operates in response to keying signals occurring during interval $T_K$ of each horizontal blanking interval (FIG. 2), for sampling and comparing the level of brightness reference voltage $V_R$ with the blanking level of the signal then appearing at the b signal output of matrix 18. Filter 30 stores a voltage proportional to the difference between these two levels. If an imbalance or difference exists between these two levels, comparator 25 generates an output correction signal which appears on filter 30 and is applied to a D.C. level control input of luminance processor 16. For example, the correction signal can be applied to an amplifier within luminance processor 16 for varying the D.C. bias of the amplifier, and thereby the D.C. level of output luminance signal Y during the horizontal blanking interval.

The correction signal serves to modify the D.C. level of the output signal from processor 16, and thereby also the D.C. level of the b signal output from matrix 18, in a direction to minimize the difference between the sampled signal inputs to comparator 25. By this mechanism, the luminance signal D.C. level and thereby the brightness determinative D.C. level of each of the r, g, b color signals are maintained in accordance with the level of brightness reference voltage $V_R$.

In this example, filter 30 comprises a capacitor that is charged and discharged via currents $I_c$ and $I_d$ as determined by the operation of comparator 25. An increased voltage developed on filter 30 in response to charging current $I_c$ is in a direction to reduce the background level or brightness of a displayed picture. Conversely, a reduced voltage developed on filter 30 in response to discharging current $I_d$ serves to increase the brightness of a displayed picture.

The described operation of the automatic brightness control network including comparator 25 can be impaired in the presence of significant amounts of noise (e.g., on the order of one volt) in the sensed video signal, particularly during interval $T_K$ when the control network operates. Such noise can cause a false correction voltage to be developed on filter 30 in accordance with the magnitude and polarity of the noise signals, with attendant improper control of the D.C. level of the video signal. In addition, large noise pulses of either polarity can exceed the dynamic control range of comparator 25 and momentarily exhaust the current conduction capacity of comparator 25, whereby the magnitude of the average current conducted to and from filter 30 is limited. Therefore, the automatic brightness control network cannot compensate fully in the presence of such noise pulses, resulting in momentarily uncorrected changes in picture brightness level. This condition essentially corresponds to a momentarily opened brightness control loop, since a control voltage directly proportional to the level of the noise pulses to be compensated is not provided by the system. The impact of noise upon the operation of the automatic brightness control network is virtually eliminated by means of a switched filter network 40.

Network 40 is arranged in the overall video signal processing system of FIG. 1 prior to comparator 25, but after the point in the receiver at which the horizontal line synchronizing component of the video signal is extracted from the video signal by means of a sync separator (not shown) for use by deflection circuits of the receiver. Network 40 comprises a switching transistor 42 and a filter capacitor 45 in the collector circuit of transistor 42. The collector-emitter path of transistor 42 and capacitor 45 are serially connected between a point A in the luminance signal processing path and a point of reference potential (ground).

Transistor 42 is non-conductive at all times except during the horizontal retrace blanking intervals ($T_B$ in FIG. 2) including interval $T_K$ during which comparator 25 is keyed to operate. Accordingly, capacitor 45 is decoupled for filtering purposes from the luminance signal path during the horizontal line image (trace) intervals when transistor 42 is nonconductive. Transistor 42 is keyed to conduct over each horizontal retract interval $T_B$ in response to locally generated positive horizontal retrace flyback pulses applied to the base of transistor 42 via a resistor 50 and a diode 55. The horizontal flyback keying pulses exhibit a positive peak amplitude of approximately +180 volts, and a peak-to-peak amplitude of approximately 200 volts.

Transistor 42 exhibits a highly conductive saturated state when keyed to conduct by the horizontal blanking pulses. The collector-emitter path of transistor 42 then exhibits a very low impedance, whereby capacitor 45 is then connected between point A and ground via a low impedance path. When this occurs, capacitor 45 forms a filter to ground together with the effective impedance presented by delay line 15 and resistors 62 and 64, for bypassing high frequency signals including noise to ground and away from the luminance signal processing path including unit 16 during the horizontal blanking and keying intervals. Accordingly, the b signal from matrix 18 as sensed by comparator 25 during interval $T_K$ is substantially devoid of noise at this time due to the filtering action of network 40. Therefore, the automatic brightness control network including comparator 25 operates unimpeded by the effects of noise.

The time constant associated with filter network 40 when keyed to operate is sufficiently long so that high frequency noise signals are significantly attenuated at point A in the luminance signal processing path. On the other hand, the time constant is sufficiently short so that the sync pulse occurring during interval $T_s$ (FIG. 2) is not significantly distorted. In this example, this time constant is determined by the value of capacitor 45 and the effective impedance of delay line 15 and resistors 62, 64 as presented at point A. Resistors 62 and 64 together with a source of D.C. potential (+10.9 volts) otherwise form a voltage divider for shifting the D.C. level of the luminance signal. The effective impedances of delay line 15 and of voltage divider 62, 64 are each approximately 680 ohms, whereby the effective impedance at point A is approximately 340 ohms. This impedance value together with the value of capacitor 45 produce a time constant on the order of 0.75 microseconds for filter network 40.

It is noted that transistor 42 and filter capacitor 45 are coupled to the luminance signal path at point A after delay line 15. Coupling the filter circuit in this manner serves to minimize the effects of misterminating the output of delay line 15 when transistor 42 is keyed to conduct.

A resistor 58 coupled across the base-emitter junction of transistor 48 provides a leakage current path to ground to ensure that transistor 42 turns off quickly at the end of the horizontal flyback keying interval, by discharging the collector-base and base-emitter junction capacitances of transistor 42 that were charged when transistor 42 was conducting. Diode 55 serves to prevent reverse voltage breakdown of the base-emitter junction of transistor 42 due to the negative voltage associated with the horizontal flyback synchronizing signal during the image trace interval.

Other versions of switched filter network 40 are also possible. For example, network 40 in FIG. 1 can be replaced by a network 140 as shown in FIG. 3, wherein elements common to FIG. 1 are indicated by the same reference number.

Figure 3:
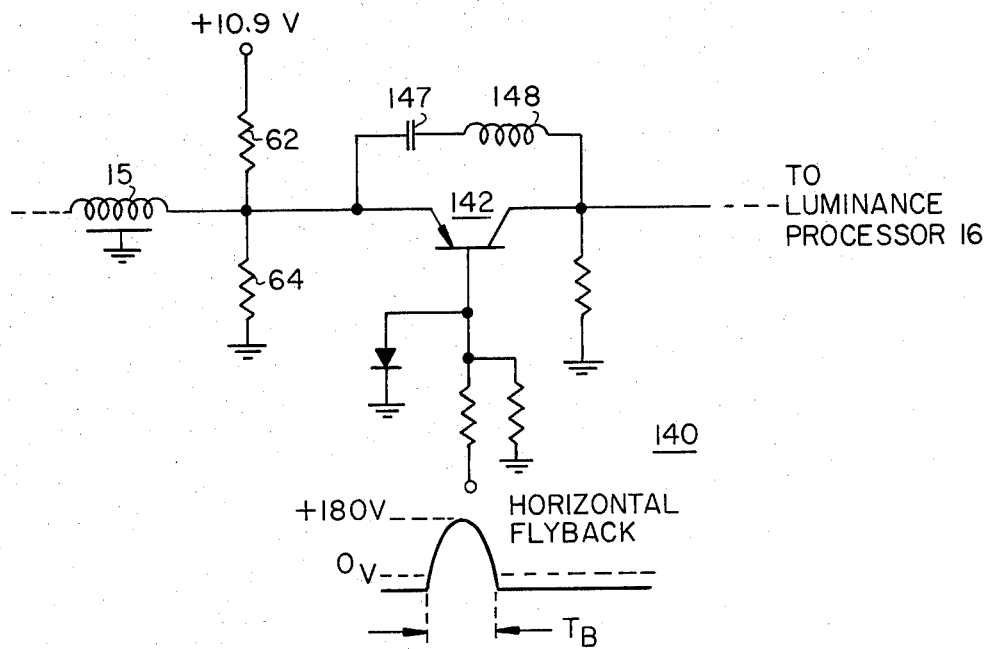
FIG. 3 shows an alternate version of a circuit according to the present invention.

In FIG. 3 a PNP switching transistor 142 is arranged in series with the luminance signal path. The emitter and collector electrodes of transistor 142 are coupled to the output of delay line 15 and to the input of processor 16, respectively. The collector-emitter path of transistor 142 is arranged in parallel with a low pass filter comprising the series combination of a D.C. blocking capacitor 174, and an inductor 148 which acts as a high frequency choke.

Transistor 142 conducts in a saturated state during each horizontal image line (trace) interval $T_l$ in response to a negative voltage applied to the base of transistor 142 from the horizontal line synchronizing signal at this time. Luminance signals are then coupled to processor 16 via transistor 142, since network 147, 148 is bypassed by the very low collector-emitter impedance of transistor 142 when conducting. The positive horizontal flyback pulses render transistor 142 nonconductive during each horizontal blanking interval. At this time, luminance signals from delay line 15 are coupled to processor 16 via low pass filter 147, 148, which serves to suppress unwanted high frequency signals such as noise during each horizontal blanking interval. Accordingly, noise signals are prevented from impairing the operation of the brightness control circuit.

What is claimed is:

1. In a television receiver including a video signal channel for processing an image representative video signal having periodically recurring image intervals, and image blanking intervals disposed between adjacent image intervals and containing a blanking level determinative of image brightness, apparatus comprising:
    means for providing a reference signal representative of a desired image blanking level;
    means coupled to said reference source and to said video channel for clamping said blanking level to a level proportional to said reference signal during said blanking intervals;
    filter means; and
    means for selectively coupling said filter means to said video channel prior to said clamping means during said blanking intervals to suppress high frequency signal including noise when present in said video channel, and for decoupling said filter means from said video channel during said image intervals.

2. Apparatus according to claim 1, wherein:
    said clamping means operates during a portion of said blanking interval less than the duration of said blanking interval; and
    said filter means is selectively coupled to said video channel for an interval greater than said portion of said blanking interval when said clamping means operates.

3. Apparatus according to claim 1, wherein:
    said filter means is selectively coupled to said video channel for an interval substantially coincident with said blanking interval.

4. Apparatus according to claims 2 or 3, wherein:
    said filter means comprises a capacitor; and
    said selective coupling means comprises a controllable conduction device operable between low and high impedance states for selectively coupling said capacitor between said video channel and a point of reference potential during said blanking intervals.

5. Apparatus according to claim 4 and further comprising:
    a source of switching signals substantially coincident with said blanking intervals; and wherein
    said selective coupling means comprises a transistor with an input first electrode coupled to said source of switching signals, and second and third output electrodes defining a main current conduction path of said transistor, said main current path of said transistor being coupled to said capacitor.

6. Apparatus according to claim 5, wherein:
    said switching signals correspond to horizontal line flyback pulses.

7. Apparatus according to claim 5 and further comprising:
    a direct current conduction path coupled from said input electrode of said transistor to a point of reference potential.

8. Apparatus according to claim 7, wherein:
    said first, second and third electrodes correspond to base, collector and emitter electrodes of said transistor.

9. In a television receiver including a video signal channel for processing an image representative video signal having periodically recurring image intervals, and image blanking intervals disposed between adjacent image intervals and containing a blanking level determinative of image brightness, apparatus comprising:
    means for providing a reference signal representative of a desired image blanking level;
    means coupled to said video channel for comparing said blanking level and said reference signal during said blanking interval, to provide an output control signal indicative of a difference between said reference signal and said blanking level;
    means for coupling said output of said comparing means to said signal transmission channel, for varying said blanking level in a direction to reduce said difference to a minimum;
    filter means; and
    means for selectively coupling said filter means to said video channel prior to said comparing means during said blanking intervals to suppress high frequency signals including noise when present in said video channel, and for decoupling said filter means from said video channel during said image intervals.

10. In a system including a video signal transmission channel for processing an image representative video signal having periodically recurring image intervals, and image blanking intervals disposed between succeeding image intervals and containing a blanking level determinative of image brightness, apparatus comprising:
    a source of reference signal;
    a source of keying signals coincident with a portion of said blanking interval containing said blanking level;
    a comparator network responsive to said keying signals and havng a first input coupled to said source of reference signal for sensing said reference signal, a second input coupled to said signal transmission channel at a first point for sensing said blanking level, and an output for providing a control signal in response to a signal difference appearing between said first and second inputs and representative of a difference in magnitude between said blanking level and said reference signal;
    means for coupling said control signal to a second point in said signal transmission channel prior to said first point to form a closed loop with said signal transmission channel, for varying said blanking level in a direction to reduce said signal difference to a minimum;
    filter means; and means for selectively coupling said filter means to said video channel prior to said comparator network during said blanking intervals to suppress high frequency signals including noise when present in said video channel and for decoupling said filter means from said video channel during said image intervals.

11. Apparatus according to claim 10, wherein:

said filter means is selectively coupled to said video channel for an interval substantially coincident with said blanking interval.

12. In a color television receiver including a video signal transmission path for processing a color image representative video signal, said transmission path including a chrominance channel for processing a chrominance component of said video signal and a luminance channel for processing a luminance component of said video signal having periodically recurring image intervals and image blanking intervals disposed between adjacent image intervals and containing a blanking level determinative of image brightness, said luminance channel including signal delaying means for equalizing the signal processing transit time of said luminance channel with the signal processing transit time of said chrominance channel, apparatus comprising:

a source of reference signal;

a source of keying signals coincident with a portion of said blanking interval container said blanking level;

a comparator network responsive to said keying signals and having a first input coupled to said source of reference signal for sensing said reference signal, a second input coupled to said video signal transmission path at a first point for sensing said blanking level, and an output for providing a control signal in response to signal difference appearing between said first and second inputs and representative of a difference in magnitude between said blanking level and said reference signal;

means for coupling said control signal to said luminance channel at a second point in said video signal transmission path prior to said first point to form a closed loop with said video signal path, for varying said blanking level in a direction to reduce said signal differences to a minimum;

filter means; and means for selectively coupling said filter to said video signal path between said delaying means and said comparator network during said blanking intervals to suppress high frequency signals including noise when present in said video signal path, and for decoupling said filter from said video signal path during said image intervals.

* * * * *